A. KÖHLER.
MACHINE FOR FILLING SAUSAGES AND THE LIKE.
APPLICATION FILED DEC. 17, 1914.
1,143,715.
Patented June 22, 1915.
3 SHEETS—SHEET 3.
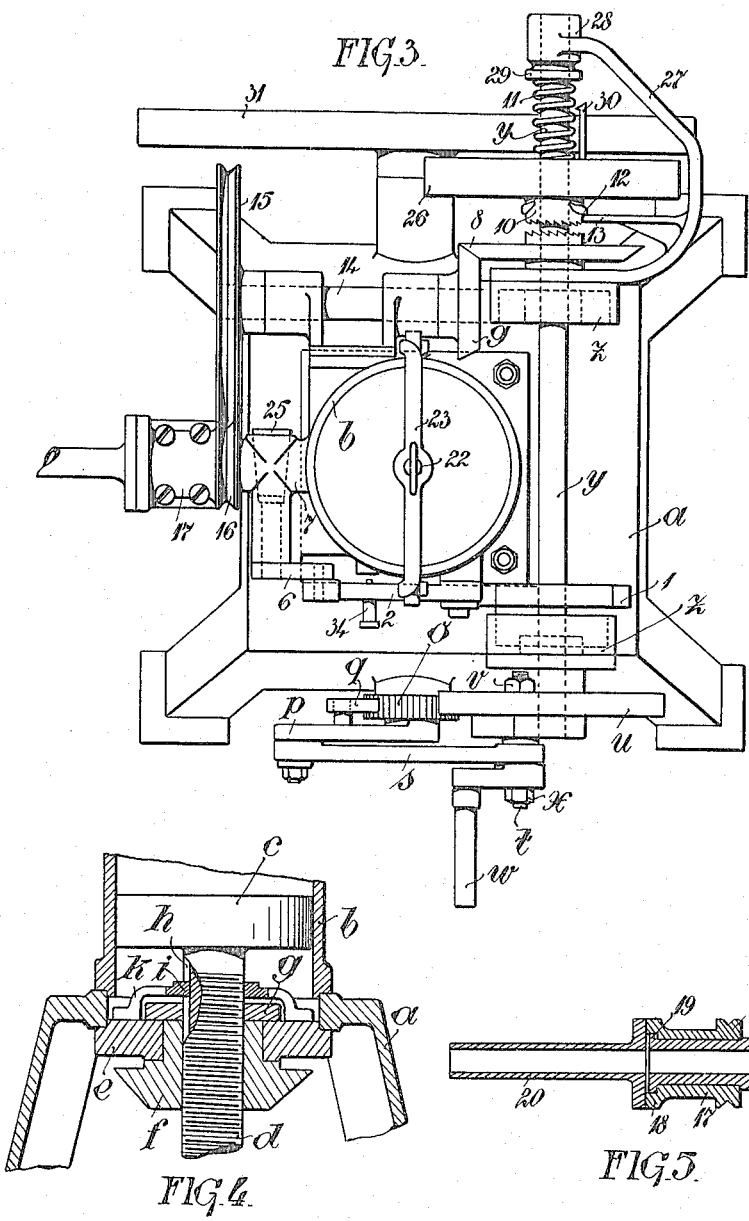
Witnesses:
M. M. Border.
H. E. Bready.
Inventor:
A. Köhler.
By C. Croydon Marks
Attorney.

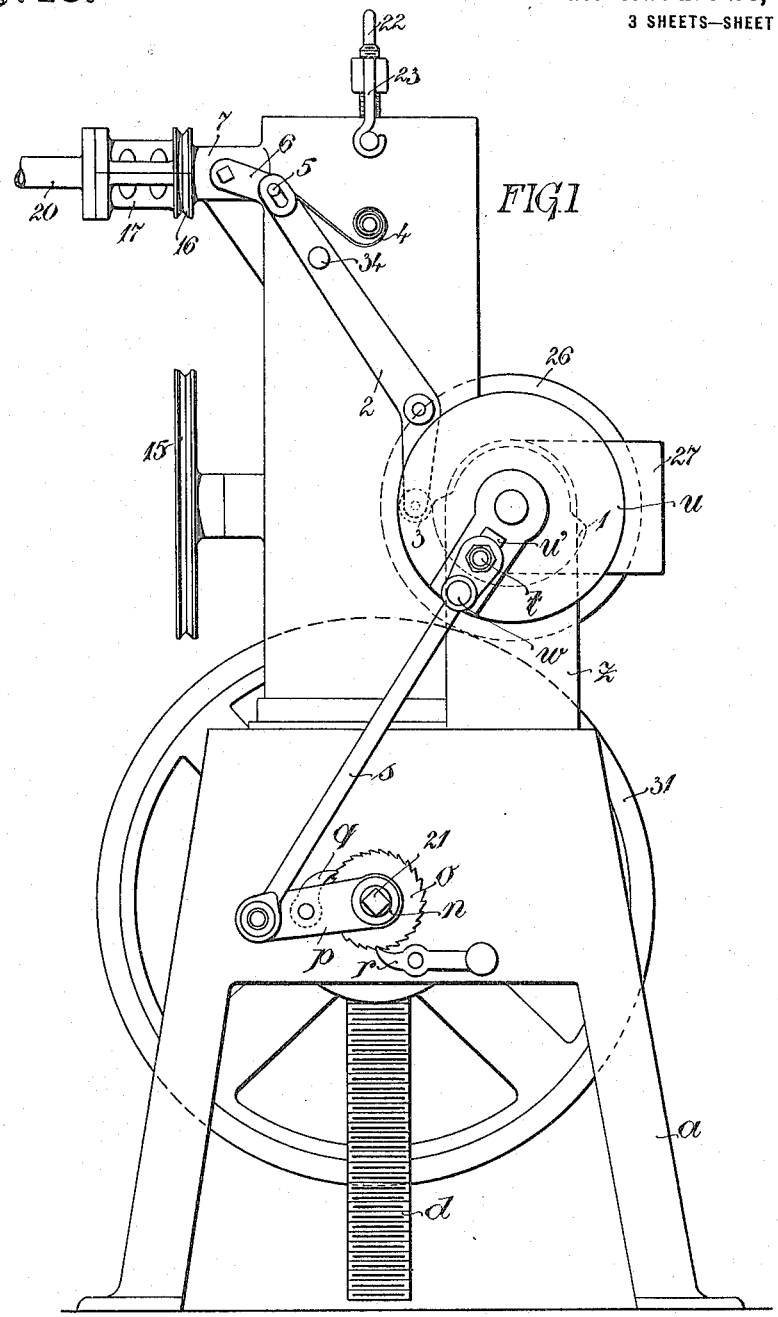

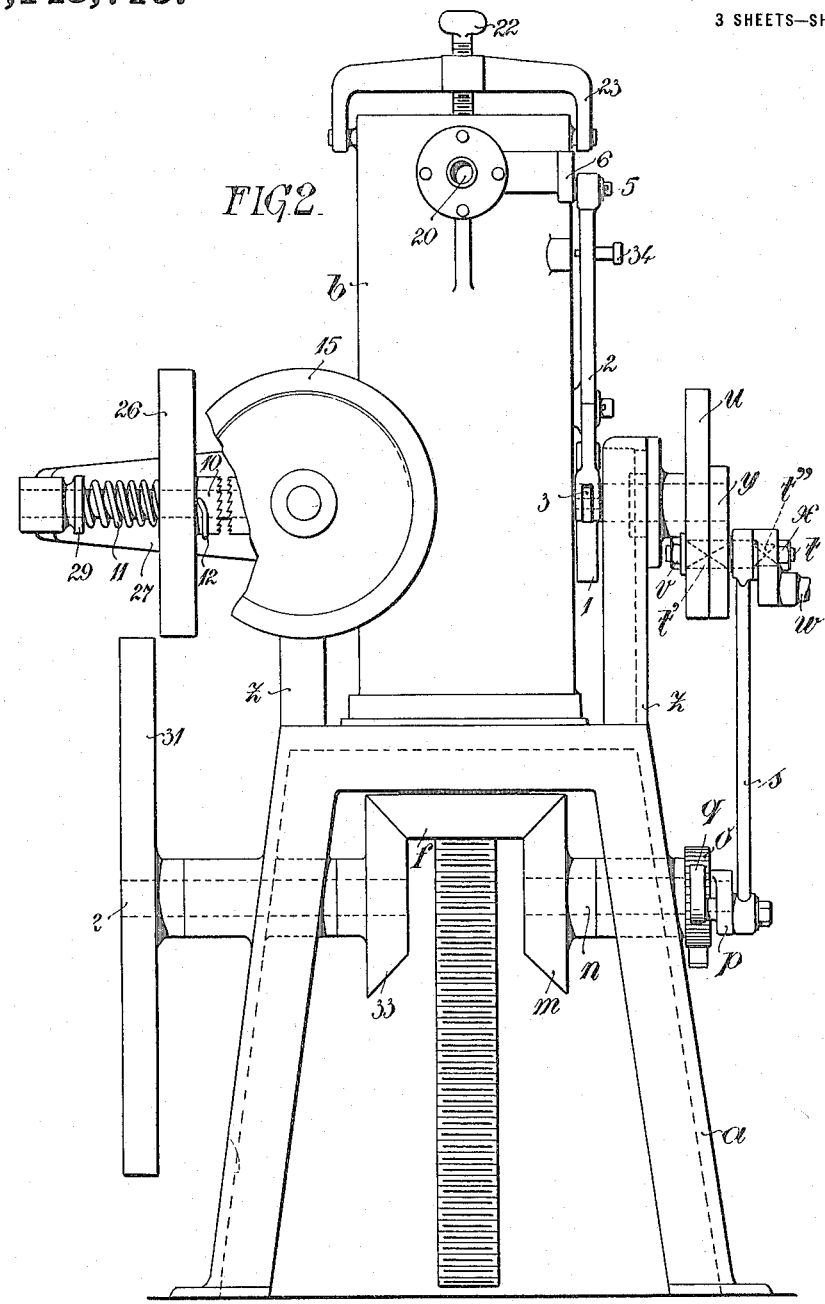

UNITED STATES PATENT OFFICE.

ADOLF KÖHLER, OF BERLIN, GERMANY.

MACHINE FOR FILLING SAUSAGES AND THE LIKE.

1,143,715. Specification of Letters Patent. Patented June 22, 1915.

Application filed December 17, 1914. Serial No. 877,690.

*To all whom it may concern:*

Be it known that I, ADOLF KÖHLER, a subject of the Emperor of Germany, and residing at 65 Petersburgerstrasse, Berlin, Germany, have invented certain new and useful Improvements in Machines for Filling Sausages and the like, of which the following is a specification.

My invention relates to improvements in machines for filling sausages of determined weight; and the object of my improvement is to provide a machine which not only automatically effects the filling, the dividing and the twisting-off of the sausages, but which is also adapted to be changed, by a few simple manipulations, into an ordinary sausage filling machine, in which case the automatic dividing and twisting-off does not take place.

With the machine constructed according to the present invention, which is provided with a stepwise forwardly moved piston, a stop-cock and a periodically acting twisting-off device, the movable sleeve of the coupling which connects the twisting-off device is provided with a pinion and with a spring-catch which, on the movement of the sleeve by hand, engages behind a collar or the like in order to permanently hold the coupling out of engagement and to bring the pinion into engagement with a second gear wheel which actuates the piston spindle by the intermediary of bevel wheels, while the driving mechanism for the stop-cock can be disengaged when the cock is open. If the coupling sleeve and the cock actuating gear are put out of action, the machine then works as an ordinary filling machine.

I attain this object by the mechanism illustrated by way of example in the accompanying drawings, in which:—

Figure 1 is a front view of the machine, Fig. 2 is a side view thereof, Fig. 3 a plan, Fig. 4 the lower end of the pressure cylinder and the neighboring parts in vertical section, and Fig. 5 a section through the spout for the sausage skin and the sleeve carrying same.

Upon the frame $a$ is secured the pressure cylinder $b$. Within said cylinder is the piston $c$ rigidly secured to a screw spindle $d$. Below the cylinder $b$ there is screwed on the machine frame $a$ a plate $e$ (Fig. 4) provided with a center opening concentric to the cylinder axis. Through this opening extends the hub of the gear wheel $f$, the bore of which is provided with a screw to fit that on the spindle $d$. The gear wheel $f$ is held to the plate $e$ by means of plate $g$ screwed to said gear wheel. The spindle $d$ is provided with a longitudinal groove $h$, in which engages a projection $i$ formed on a bridge $k$ which is likewise secured to the plate $e$. The projection $i$ prevents the spindle $d$ from rotating, so that on the rotation of the bevel wheel $f$, the said spindle is raised or lowered. With the bevel wheel $f$ there engages a bevel wheel $m$ keyed to a shaft $n$ on whose other end is mounted a ratchet wheel $o$ (Fig. 2). On the shaft $n$ is rotatably mounted the crank arm $p$ which is provided with a pawl $q$ (Fig. 1). With the ratchet wheel $o$ there further engages a pawl $r$ which is secured to the machine frame $a$ and provided with a weight which holds the pawl permanently in engagement with the ratchet wheel.

As shown in Fig. 1, the ratchet wheel $o$ and the bevel wheels $m$, $f$ are carried around on the rotation of the crank arm $p$ in the clockwise direction, while on the rotation of the crank arm in the opposite direction, no rotation of the bevel wheels takes place.

From the crank arm $p$ extends a connecting rod $s$ upward to a crank pin $t$. This pin is secured in a radial groove $u'$ of a disk $u$ by means of a square member $t'$ in such a manner that, after releasing the nut $v$, said pin can be displaced radially. The front end of the crank pin is provided with the handle $w$ which, by means of the square member $t''$, is prevented from rotating and held securely by the nut $x$. That part of the handle $w$ surrounding the member $t''$ of the crank pin may be of elongated slot shape, so that the handle is adjustable in the radial direction. The purpose of this is, on increasing the crank radius, to be able to reduce the distance of the handle $w$ from the axis of the disk $u$. The disk $u$ is keyed to a shaft $y$ which is held by two vertical posts $z$ of the frame $a$. Between the two posts $z$, the shaft $y$ carries a cam disk 1 which acts upon a bell-crank lever 2, whose roller 3 is always held by means of spring 4 in contact with the periphery of the cam disk 1. The upwardly extending arm of the bell-crank lever 2 is approximately three times as long as the lower arm and grasps the pin 5 of a crank 6 by means of a slot at its lower end. The crank 6 is secured to a spindle of a cock-plug 25 which extends from the smaller end of the plug. The cock-casing is supported by the support 7, through which the sausage mass emerges from the pressure cylinder $b$.

The cam-disk 1 is of such formation that during one half of the revolution of the disk, the cock is opened and during the other half of the rotation, said cock is closed.

At the rear end the shaft $y$ carries a bevel-wheel 8 which engages with a second bevel-wheel 9. The bevel-wheel 8 is arranged rotatably upon the shaft $y$, but prevented from lateral movement. The rear end of the hub of the wheel 8 is provided with claws or teeth, with which teeth or claws of a sleeve 10 coact which is movable along the shaft $y$, but prevented from rotating on said shaft. A spring 11 has the tendency to press the sleeve 10 against the hub of the wheel 8, in other words to effect the coupling between the sleeve and the wheel. In order to release the coupling, the sleeve 10 is provided with a controlling cam 12 which extends over about half the periphery of the sleeve and coacts with a projection 13 secured to the machine frame.

The bevel wheel 9 is secured on a shaft 14 which is held by the cylinder $b$ and at the other end carries a cord pulley 15. This pulley is situated in line with a small cord pulley 16 formed on a divided sleeve 17 (Fig. 5). Said sleeve is provided with a groove 18 which engages over a collar 19 provided on the boss 17 of the cylinder. This boss prevents a movement of the sleeve 17. The front end of the sleeve is provided with a flange against which is screwed the flange of the spout 20.

With the form of construction illustrated, there is indeed shown a hand-crank $w$, but the machine could of course also be driven by a motor or from shafting. In this case only the pulley $u$ requires to be formed as a belt pulley. The motor for driving the machine could be secured on the machine frame $a$ in the neighborhood of the floor or else above the machine.

The upper end of the pressure cylinder is closed by means of a self-packing cover which is held down by means of the screw 22 arranged in the cross-bar 23.

The method of working of the machine is as follows:—When the disk $u$ is in the position illustrated in the drawing, then the crank arm $p$ is in the deepest position which it can assume with the stroke to which it is adjusted. On the rotation of the disk $u$ in clockwise direction, the crank arm $p$ is raised, the pawl $q$ carrying around the ratchet wheel $o$ and the bevel wheels $m$ and $f$. The bevel wheel $f$ lifts on rotation the spindle $d$ through a determined distance. In the form of construction under consideration, and with the adjustment of the crank pin $t$ illustrated in the drawing, the spindle rises 1 mm. on the stroke of the arm $p$, $i. e.$ on one rotation of the disk. While the disk is rotated for 180°, the cock first remains in the position shown in Fig. 1, while toward the end of the said movement, the roller 3 falls from the raised portion of the cam-disk 1 and instantaneously closes the cock by the intermediary of the lever 2, so that it closes the exit from the pressure cylinder. At the same moment the coupling sleeve 10 which has hitherto been held out of engagement is released from the member 13, so that it moves toward the bevel-wheel 8 and is coupled with same, thus putting the twisting-off mechanism into action. On the further rotation of the disk $u$ for 180°, the crank arm $p$ is again moved downward, whereby the pawl $q$ slides over the teeth of the ratchet-wheel $c$. The piston is prevented from sinking back by a pawl $r$ which renders impossible the rotation of the ratchet wheel $o$ in the anti-clockwise direction. During this movement of the disk $u$, the roller 3 slides on the deepest portion of the cam-disk 1 and holds the cock closed. Only at that moment in which the disk $u$ again assumes the position shown in Fig. 1 does the roller 3 rise on the raised portion and open the cock. At the same moment, the coupling sleeve 10 is again forced back from the part 13 and thus separated from the bevel-wheel 8, so that the twisting-off action is stopped. The above described operations then repeat themselves.

When the machine is to be used not only for preparing a number of small sausages, but also for preparing larger sausages, it is provided with the following parts:—The coupling sleeve 10 is provided with a gear-wheel 26 which is preferably in one piece with the sleeve. The rear bearing for the shaft $y$ has an arm 27 which carries a further bearing 28 for the shaft $y$. The shaft $y$ carries a collar 29, over the edge of which a spring 30 secured on the sleeve 10 can engage when the sleeve is moved sufficiently far back. On this movement the pinion 26 comes into engagement with a second gear-wheel 31 which is keyed on a shaft 32 mounted in the frame $a$. This shaft further carries a bevel-wheel 33 meshing with the bevel-wheel $f$. The lever 2 carries an arresting device 34, by means of which it can be secured in the position shown in Fig. 1, in which the cock 25 is opened.

If now the machine is to be employed for filling larger sausages, it is only necessary to push back the sleeve 10, secure the lever 2 and raise the pawl $q$. A uniform upward movement of the spindle $d$ is then obtained by the intermediary of the gear-wheels 26, 31, 33 and $f$, while the cock 25 and the spout 20 remain at rest.

When the mass contained in the cylinder is used up and the piston has arrived at the upper end of the cylinder, the piston can be moved rapidly downward, by the two pawls $q$ and $r$ being raised from the ratchet wheel and placing a suitable hand-crank on the square portion 21 (Fig. 1) by means of which a constant motion can be imparted to the bevel-wheels $m$ and $f$ without carrying around the crank arm $p$.

Having now described my invention what I claim as new and desire to secure by Letters Patent is:—

1. In a machine for filling and separating sausages, the combination of a compression piston, means for imparting to said piston an intermittent movement, a compression cylinder, a stop-cock mounted thereon, means for periodically actuating said cock, a twisting-off device, means for periodically actuating said twisting-off device, and a clutch for coupling said twisting-off device and said periodically operating means, a pinion connected to said clutch, said pinion being adapted to slide laterally, a gear-wheel adapted to actuate the compression piston, means for bringing said pinion into engagement with said gear-wheel, and means for disengaging said cock actuating means, substantially as hereinbefore described and for the purpose specified.

2. In a machine for filling and separating sausages, the combination of a compression piston, means for imparting to said piston an intermittent movement, a compression cylinder, a stop-cock mounted thereon, means for periodically actuating said cock, a twisting-off device, means for periodically actuating said twisting-off device, a clutch for coupling said twisting-off device and said periodically operating means, a pinion connected to said clutch, said pinion being adapted to slide laterally, a gear-wheel adapted to actuate the compression piston, means for bringing said pinion into engagement with said gear wheel, and means for disengaging said cock actuating means, a sleeve for said clutch, a cam thereon and a fixed projection engaging therewith, substantially as described and for the purpose specified.

In testimony whereof I have signed my name to this specification in the presence of two subscribing witnesses.

ADOLF KÖHLER.

Witnesses:
WOLDEMAR HAUPT,
HENRY HASPER.

Copies of this patent may be obtained for five cents each, by addressing the "Commissioner of Patents, Washington, D. C."